US009586517B2

(12) United States Patent
Duffe

(10) Patent No.: US 9,586,517 B2
(45) Date of Patent: Mar. 7, 2017

(54) EXTERIOR MIRROR FOR A MOTOR VEHICLE WITH LIQUID CONTAINER REFILL FUNNEL

(71) Applicant: Ford Global Technologies, LLC, Dearborn, MI (US)

(72) Inventor: Tobias Duffe, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 375 days.

(21) Appl. No.: 14/164,157

(22) Filed: Jan. 25, 2014

(65) Prior Publication Data

US 2014/0211494 A1 Jul. 31, 2014

(30) Foreign Application Priority Data

Jan. 28, 2013 (DE) .................. 10 2013 201 314

(51) Int. Cl.
*B60R 1/02* (2006.01)
*B60Q 1/24* (2006.01)
*B60S 1/50* (2006.01)
*B60R 1/06* (2006.01)
*B60R 1/12* (2006.01)

(52) U.S. Cl.
CPC .................. *B60Q 1/24* (2013.01); *B60R 1/06* (2013.01); *B60R 1/12* (2013.01); *B60R 1/1207* (2013.01); *B60S 1/50* (2013.01)

(58) Field of Classification Search
CPC . B60R 1/02; B60R 2011/0033; B60S 1/3862; B60S 1/50
USPC ........................ 362/494; 15/250.01
See application file for complete search history.

(56) References Cited

U.S. PATENT DOCUMENTS

| 5,533,766 | A | * | 7/1996 | Farber | .................. B60K 15/05 292/144 |
| 6,223,385 | B1 | | 5/2001 | Berge et al. | |
| 8,327,495 | B1 | * | 12/2012 | Martinez | .................. B60S 1/56 15/250.003 |
| 2004/0142232 | A1 | * | 7/2004 | Risca | ................. B60H 1/00514 429/100 |
| 2006/0244288 | A1 | * | 11/2006 | Sandhu | ................ B62D 25/081 296/192 |
| 2011/0226359 | A1 | * | 9/2011 | Taylor | ..................... B60Q 3/06 137/558 |

FOREIGN PATENT DOCUMENTS

| DE | 60015648 | 12/2005 |
| EP | 22336367 | 10/2010 |
| FR | 2895357 | 6/2007 |

OTHER PUBLICATIONS

German Examination Report dated Sep. 26, 2013.

* cited by examiner

*Primary Examiner* — William Carter
(74) *Attorney, Agent, or Firm* — Jason Rogers; Brooks Kushman P.C.

(57) ABSTRACT

An exterior mirror for a motor vehicle that has a filling funnel for filling at least one liquid container arranged in the motor vehicle. The exterior mirror may have an optical fluid level display. The exterior mirror also includes a flap that is opened to provide access to the filling funnel. The flap may comprise a portion of the outer surface of a housing portion of the exterior mirror.

11 Claims, 2 Drawing Sheets

EXTERIOR MIRROR FOR A MOTOR VEHICLE WITH LIQUID CONTAINER REFILL FUNNEL

CROSS-REFERENCE TO RELATED APPLICATIONS

This application claims foreign priority benefits under 35 U.S.C. §119(a)-(d) to DE 10 2013 201 314.0 filed Jan. 28, 2013, which is hereby incorporated by reference in its entirety.

TECHNICAL FIELD

The present invention relates to an exterior mirror for a motor vehicle that includes a liquid container refill port.

BACKGROUND

Exterior mirrors are customarily arranged on the exterior of a motor vehicle. Exterior mirrors are provided on an outer longitudinal side of the motor vehicle and include a mirror surface that provides visibility for the driver of things behind the motor vehicle and facilitate keeping the driver informed about the surrounding traffic.

Motor vehicles have a multiplicity of windows and lenses, for example windshields and rear windows, headlight lenses and the like, that should be kept clean to assure safe operation of the motor vehicle in traffic. Window and lens cleaning systems used for cleaning vehicle windows and lenses of this type and are known. A window and lens cleaning system is described, for example, in U.S. Pat. No. 6,223,385 B1.

Window and lens cleaning systems of this type include a storage container for window and lens cleaning liquid. The storage container is manufactured with an integral filler neck and is arranged in the engine compartment of the motor vehicle. The filler neck can be closed by a closure cover. The engine hood of the motor vehicle has to be opened and retained in the open position to refill the storage container with window and lens cleaning fluid. The storage container of the window and lens cleaning system must be located from among a plurality of containers arranged in the engine compartment and the closure cover must be opened to refill the container.

One disadvantage of such window and lens cleaning systems is that the refilling of the storage container is very awkward. The closure cover may be soiled by dust and abraded material mixed with engine oil and generally cannot be refilled without making a person's hands or the clothing dirty. The selection of the storage container from among a plurality of containers arranged in the engine compartment causes particular difficulties in darkness. Raising and closing the engine hood can also make the refilling operation more difficult because of the required actuating forces on account of the weight of the engine hood.

EP 2 236 367 A1 proposes the solution of arranging the storage container of a window and lens cleaning system by locating the filler neck in a door frame of the driver's door.

SUMMARY

According to one aspect of this disclosure, an exterior mirror for a motor vehicle has a filling funnel for filling at least one liquid container arranged in the motor vehicle, in particular a storage container for a window and lens cleaning system of the motor vehicle. According to the present invention, the position of the filler neck of the liquid container arranged in the motor vehicle is therefore specified on the exterior mirror of the motor vehicle. A filling funnel should be broadly interpreted as meaning a substantially tubular section with an inlet opening that has a larger diameter than the tubular section. This facilitates the pouring a liquid into the narrower tubular section through the wider inlet opening to substantially avoid spilling the liquid next to the funnel.

The arrangement of the filling funnel in the exterior mirror permits filling the liquid container at the exterior mirror. The liquid container does not have to be selected by the appearance thereof from among a plurality of liquid containers in an engine compartment of the motor vehicle. Confusion of the liquid container to be refilled with other liquid containers of the motor vehicle is avoided. The liquid container can be arranged virtually arbitrarily in the motor vehicle, in particular in an engine compartment of the motor vehicle. The liquid container can be filled through a filling funnel located in the exterior mirror without opening the engine hood. The risk of soiling to the person carrying out the refilling is reduced because of the easy accessibility of the filling opening in the liquid container in the exterior mirror. The exterior mirror in a passenger vehicle is located at an ergonomically favorable height to allow the refilling operation to be carried out simply, conveniently and with little effort.

The exterior mirror includes a filling funnel with a liquid-conducting connection to the liquid container. The liquid-conducting connection can comprise, for example, a flexible hose, a tube or a connecting pipe and the like, that can be connected in a liquid-conducting manner to the end of the tubular section that is opposite the inlet opening of the filling funnel. The liquid-conducting connection extends between the filling funnel and the liquid container.

The exterior mirror may have a housing that receives the filling funnel and has an openable and closeable pivotably mounted flap. The flap covers or closes the filling funnel in the closed state and provides access to the filling funnel in the open state. The filling funnel is easily accessible for filling the liquid container and dirt is prevented from entering the filling funnel in the closed state of the flap.

The outer side of the flap forms an outer surface of the housing. The flap covers the filling funnel in the closed state and protects the latter from soiling and imparts a positive external appearance to the exterior mirror in the closed state of the flap. In addition, the flap forms a part of the exterior mirror housing, and provides an aerodynamic cover for the funnel. The drag caused by the exterior mirror is essentially not increased in comparison to a conventional exterior mirror.

An optical display means for signaling a level of the liquid container may be provided on the exterior mirror. The current fluid level can be displayed and the display may also indicate whether refilling is required. The display can also inform the user, directly at the exterior mirror, towards the end of the refilling operation whether the liquid is reaching of the maximum level of the liquid container to avoid overfilling.

The filling funnel may be illuminated by an illuminating device. The illuminating device for illuminating the surroundings of the motor vehicle that may be integrated in the exterior mirror. The illuminating device can automatically be switched on during the refilling operation when the flap is opened. The illuminating device may substantially facilitate the filing operation in darkness.

The illuminating device may also serve as the optical display for signaling the level of liquid in the liquid container. The illuminating device may display a different color depending on the level or the illuminating device may flash or not flash depending on the level.

The exterior mirror may have a closing device that permits manual closing of the flap that releases the flap only when an electric signal is present for opening the flap. The electric signal can preferably be triggered in the interior of the motor vehicle by the person carrying out the refilling to avoid unauthorized opening of the flap at the exterior mirror.

The motor vehicle has at least one exterior mirror and at least one liquid container for receiving a liquid. The filling funnel is connected in a liquid-conducting manner to the liquid container. The position of the filler neck of the liquid container arranged in the motor vehicle is accessible on the exterior mirror of the motor vehicle. The arrangement of the filling funnel in the exterior mirror permits filling the liquid container at the exterior mirror. The liquid container does not have to be selected from among a plurality of liquid containers in the engine compartment of the motor vehicle. Confusion is avoided between the liquid containers to be refilled with other liquid containers of the motor vehicle. The liquid container can be arranged virtually arbitrarily in the motor vehicle, in particular, in the engine compartment of the motor vehicle. The liquid container can be refilled via the filling funnel arranged in the exterior mirror without opening of the engine hood. The risk of soiling to the person carrying out the refilling is reduced by the easy accessibility of the filling opening of the liquid container in the exterior mirror.

The liquid container may have an overflow for removing excess liquid after the maximum level of the liquid container is reached. The overflow is located to avoid discharging the liquid over the exterior mirror but rather in the vicinity of the liquid container.

Further features and advantages of the invention are described below in the detailed description of an exemplary embodiment of the invention. The illustrated exemplary embodiment should not be understood as being limiting and is explained with reference to the drawing.

DETAILED DESCRIPTION

A detailed description is provided below of several embodiments of this disclosure. The disclosed embodiments are intended as examples of the invention that may be embodied in various and alternative forms. The figures are not necessarily to scale and some features may be exaggerated or minimized to show details of particular details of particular components. The specific structural and functional details of this disclosure are not to be interpreted as limiting, but merely as a representative basis for teaching one skilled in the art how to practice this disclosure.

In the various figures, identical parts are provided with the same reference numbers and the parts are generally only described once.

Figure 1:
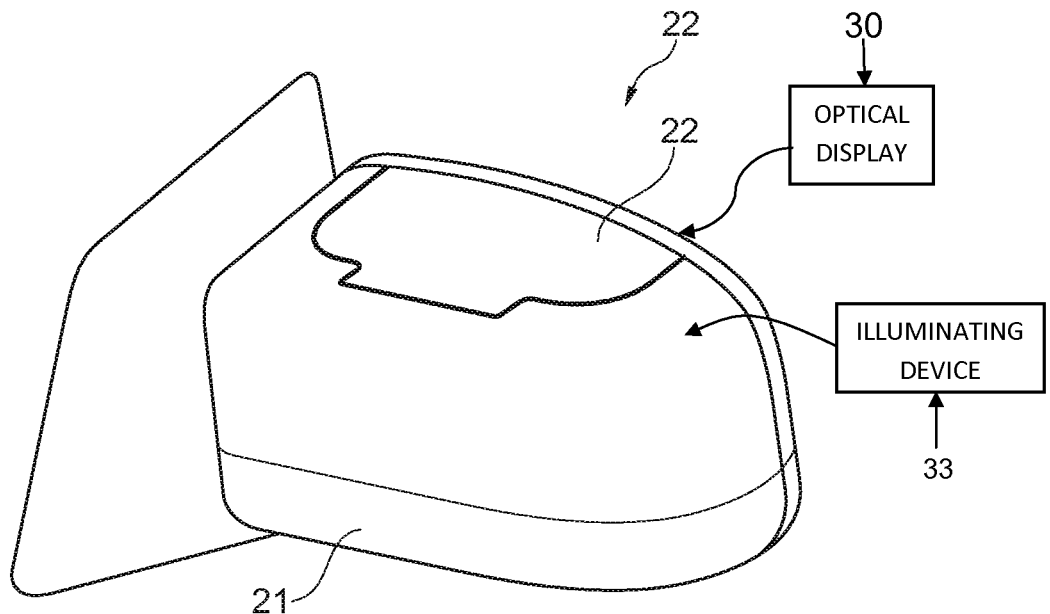
FIG. 1 is a perspective view of one embodiment of an exterior mirror in a first operating position.

FIG. 1 is a perspective view of one embodiment of an exterior mirror 20 according to the invention in a first operating position. The exterior mirror 20 has a housing 21 with a pivotable flap 22 arranged on the upper side so that the outer side of the flap 22 forms part of the outer surface of the housing 21. The flap 22 is in a closed position in the operating position shown in FIG. 1. The exterior mirror 20 includes a rear view mirror 31.

Figure 2:
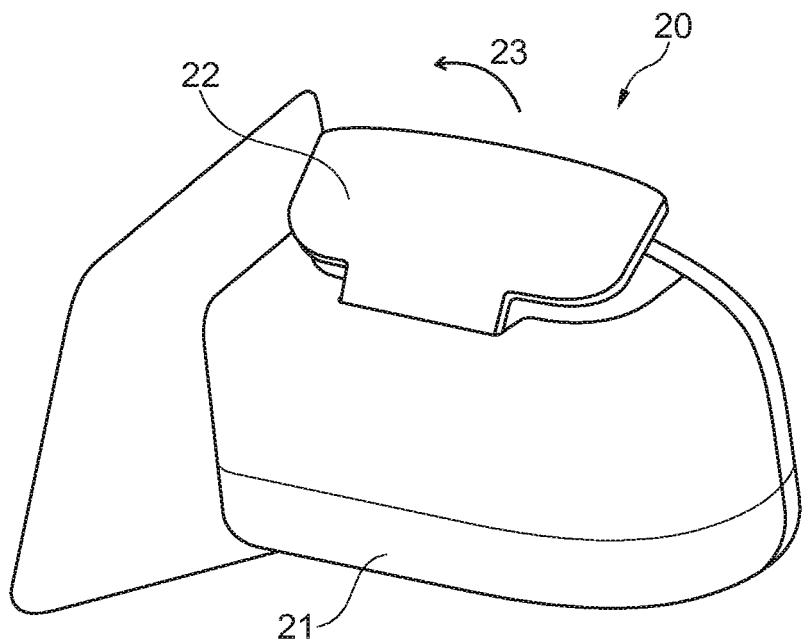
FIG. 2 is a perspective view of the exterior mirror of FIG. 1 in a second operating position.

FIG. 2 is a perspective view of the exterior mirror 20 from FIG. 1 in a second operating position. The flap 22 is shown in the direction of the opening direction 23 (indicated by a motion arrow), into a half-open operating position.

Figure 3:
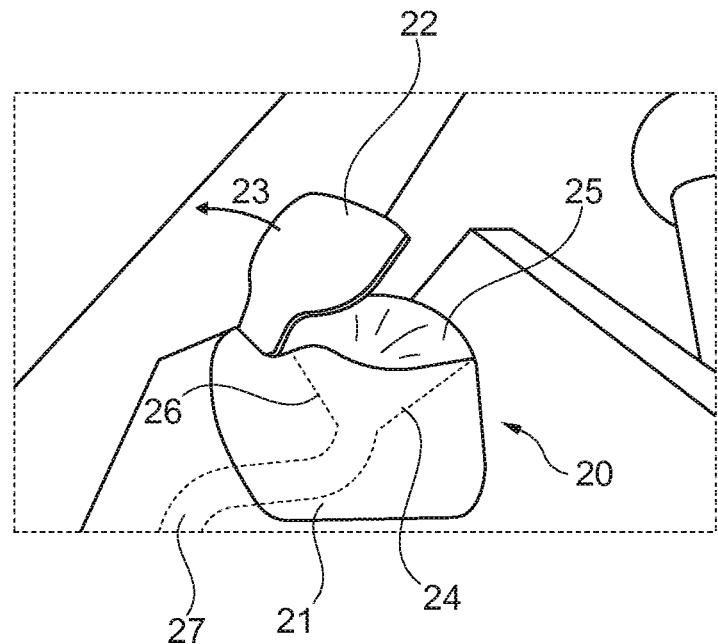
FIG. 3 is a perspective view of the exterior mirror of FIG. 1 in a third operating position.

Referring to FIG. 3, the flap 22 is illustrated in a completely open, third operating position. A filling funnel 24 is exposed by the open flap 22. The filling funnel 24 is completely accommodated in the housing 21 of the exterior mirror 20. The filling funnel is used to fill a liquid container arranged in a motor vehicle (shown in FIG. 4). The filling funnel 24 comprises an inlet opening with a relatively large diameter that is exposed by opening the flap 22. The inlet opening 25 tapers in the direction of the interior of the housing 21 and functions as the filling funnel 24 that extends to a tubular section 26. Tubular section 26 is joined to the liquid-conducting connection of the filling funnel 24 to the liquid container (shown in FIG. 4) in the form of a flexible connecting hose 27. The connecting hose 27 is connected in a liquid-conducting manner to the tubular section 26 of the filling funnel 24.

The embodiment shown in FIGS. 1 to 3, of the exterior mirror 20 is furthermore equipped with an optical display means 30 (shown diagrammatically in FIG. 1) for signaling a maximum level of the liquid container. An illuminating device 33 (shown diagrammatically in FIG. 1) for illuminating the surroundings of the motor vehicle may be integrated in the exterior mirror 20. The display means may be accommodated in the rear view mirror of the exterior mirror, through which the display means can signal the maximum level of the liquid container. The exterior mirror 20 may have a closing device that permits manual closure of the flap by the person carrying out the refilling, but releases the flap only when an electric signal for opening purposes is present. The electric signal is preferably triggered in the interior of the motor vehicle by the person carrying out the refilling.

Figure 4:
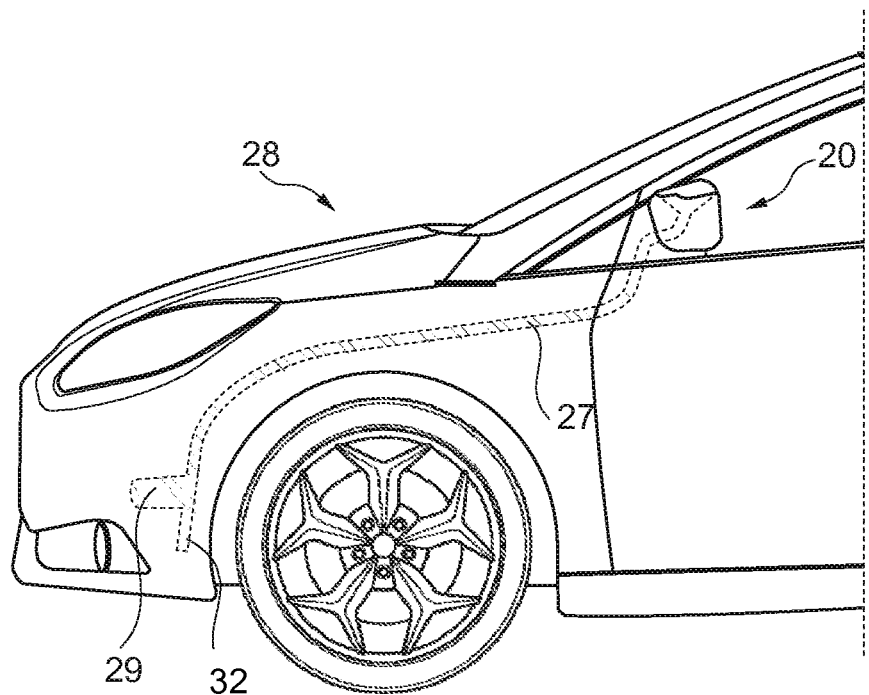
FIG. 4 is a fragmentary side view of a motor vehicle provided with the exterior mirror of FIG. 1.

FIG. 4 illustrates a side view of an exemplary embodiment of a motor vehicle 28 according to the invention. The motor vehicle 28 has an exterior mirror 20 on the illustrated vehicle longitudinal side and a liquid container 29 that is arranged in an engine compartment. The filling funnel accommodated in the exterior mirror 20 is connected to the liquid container 29 in a liquid-conducting manner via the connecting hose 27. The liquid container 29 is a storage container of the window and lens cleaning system of the motor vehicle 28 and receives the window and lens cleaning liquid. The liquid container 29 of the exemplary embodiment illustrated in FIG. 4 has an overflow 32, and therefore excess liquid during the refilling operation can be removed directly at the liquid container 29.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An exterior mirror for a motor vehicle, comprising:
   a mirror housing;
   a filling funnel disposed within the housing, the filling funnel having an inlet opening tapering in the direction of an interior of the housing to a tubular section; and
   at least one liquid container disposed in an engine compartment of the motor vehicle that may be refilled through the funnel.

2. The exterior mirror as claimed in claim 1 further comprising means for liquid-conducting connection of the filling funnel to the liquid container.

3. The exterior mirror as claimed in claim 1, further comprising an optical display means for signaling a level of the liquid container.

4. The exterior mirror as claimed in claim 1, further comprising an illuminating device for illuminating the filling funnel.

5. The exterior mirror as claimed in claim 4, wherein the illuminating device is an optical display means for signaling a level of the liquid container.

6. The exterior mirror as claimed in claim 1, further comprising;
   a flap; and
   a closing device that is utilized to manually close the flap, and wherein the flap is released only when an electrical signal is received for opening the flap.

7. An exterior mirror for a motor vehicle, comprising:
   a mirror housing:
   a filling tunnel disposed within the housing;
   a flap having an open state and a closed state and an openable and closeable flap wherein the flap closes the filling funnel in the closed state and opens the filling funnel in the open state; and
   at least one liquid container disposed in an engine compartment of the motor vehicle that may be refilled through the funnel.

8. The exterior mirror as claimed in claim 7, wherein an outer side of the flap is part of an outer surface of the housing.

9. A motor vehicle comprising:
   at least one exterior mirror;
   at least one liquid container for receiving a liquid; and
   a filling funnel housed within the exterior mirror, the filling funnel having an inlet opening tapering in the direction of an interior of the housing and connected to a tubular section in a liquid-conducting manner to the liquid container;
   a flap having an open state and a closed state, wherein the flap closes the filling funnel in the closed state and opens the filling funnel in the open state; and wherein the liquid container is arranged in an engine compartment of the motor vehicle.

10. The motor vehicle as claimed in claim 9, wherein the liquid container has an overflow for removing excess liquid.

11. The motor vehicle as claimed in claim 9, wherein the liquid container supplies liquid to a window and lens cleaning system.

* * * * *